United States Patent
Rieger et al.

(10) Patent No.: US 11,861,046 B2
(45) Date of Patent: Jan. 2, 2024

(54) SYSTEM FOR AN IMPROVED SAFETY AND SECURITY CHECK

(71) Applicant: Infineon Technologies AG, Neubiberg (DE)

(72) Inventors: Viola Rieger, Munich (DE); Manuela Meier, Munich (DE); Andreas Graefe, Munich (DE)

(73) Assignee: Infineon Technologies AG, Neubiberg (DE)

( * ) Notice: Subject to any disclaimer, the term of this patent is extended or adjusted under 35 U.S.C. 154(b) by 328 days.

(21) Appl. No.: 17/302,312

(22) Filed: Apr. 29, 2021

(65) Prior Publication Data

US 2022/0350929 A1 Nov. 3, 2022

(51) Int. Cl.
| | |
|---|---|
| *G06F 21/72* | (2013.01) |
| *H04L 9/32* | (2006.01) |
| *G06F 21/64* | (2013.01) |
| *G06F 11/07* | (2006.01) |

(52) U.S. Cl.
CPC .......... *G06F 21/72* (2013.01); *G06F 11/0706* (2013.01); *G06F 11/0751* (2013.01); *G06F 11/0772* (2013.01); *G06F 21/64* (2013.01); *H04L 9/3242* (2013.01); *H04L 2209/12* (2013.01)

(58) Field of Classification Search
CPC .. G06F 21/72; G06F 11/0706; G06F 11/0751; G06F 11/0772; G06F 21/64; G06F 21/57; G06F 21/602; H04L 9/3242; H04L 2209/12; H04L 2209/125; H04L 9/004
See application file for complete search history.

(56) References Cited

U.S. PATENT DOCUMENTS

| | | | | |
|---|---|---|---|---|
| 8,020,115 | B2* | 9/2011 | Borri | H03M 13/293 |
| | | | | 715/785 |
| 2002/0191793 | A1* | 12/2002 | Anand | G06F 21/72 |
| | | | | 380/255 |
| 2003/0005317 | A1* | 1/2003 | Audebert | H04L 63/20 |
| | | | | 713/193 |

(Continued)

FOREIGN PATENT DOCUMENTS

| | | | | |
|---|---|---|---|---|
| CN | 102064958 B | * | 4/2015 | H04L 41/12 |
| EP | 4089538 A1 | * | 11/2022 | G06F 11/0721 |

(Continued)

*Primary Examiner* — Shahriar Zarrineh
(74) *Attorney, Agent, or Firm* — Harrity & Harrity, LLP (57) ABSTRACT

A system may include a cryptographic accelerator to generate a first check value based on a payload received in a message, and provide the first check value to a first comparator and to a second comparator. The system may include the first comparator to receive the first check value from the cryptographic accelerator, determine whether the first check value matches a second check value, the second check value being a check value received in the message, and provide a first output indicating whether the first check value matches the second check value. The system may include the second comparator to receive the first check value from the cryptographic accelerator, determine whether the first check value matches the second check value, and provide a second output indicating whether the first check value matches the second check value.

20 Claims, 3 Drawing Sheets

(56) References Cited

U.S. PATENT DOCUMENTS

| | | | | |
|---|---|---|---|---|
| 2003/0220096 | A1* | 11/2003 | Smeets | H04W 12/041 |
| | | | | 455/410 |
| 2004/0193876 | A1* | 9/2004 | Donley | H04L 1/1607 |
| | | | | 726/13 |
| 2007/0154018 | A1* | 7/2007 | Watanabe | H04L 63/0428 |
| | | | | 380/273 |
| 2008/0056488 | A1* | 3/2008 | Motoyama | G06F 7/00 |
| | | | | 380/28 |
| 2008/0098215 | A1* | 4/2008 | Belgaied | H04L 9/00 |
| | | | | 713/160 |
| 2008/0114981 | A1* | 5/2008 | Hars | G06F 21/80 |
| | | | | 713/170 |
| 2010/0128872 | A1* | 5/2010 | Cordery | H04L 9/0662 |
| | | | | 380/255 |
| 2011/0162081 | A1* | 6/2011 | Lopez | H04L 41/0806 |
| | | | | 726/26 |
| 2011/0296440 | A1* | 12/2011 | Laurich | H04L 67/1097 |
| | | | | 719/326 |
| 2012/0124374 | A1* | 5/2012 | Murray | H04L 9/0643 |
| | | | | 713/168 |
| 2012/0266251 | A1* | 10/2012 | Birtwhistle | H04W 12/50 |
| | | | | 726/26 |
| 2014/0006797 | A1* | 1/2014 | Cordella | G06F 12/1408 |
| | | | | 713/189 |
| 2014/0233732 | A1* | 8/2014 | Buer | H04N 21/2543 |
| | | | | 380/200 |
| 2016/0080375 | A1* | 3/2016 | Heidt | H04L 63/0823 |
| | | | | 713/171 |
| 2016/0080376 | A1* | 3/2016 | Temple | H04L 9/00 |
| | | | | 713/170 |
| 2016/0330032 | A1* | 11/2016 | Naim | G06F 21/85 |
| 2016/0344541 | A1* | 11/2016 | Duplys | H04L 9/0631 |
| 2017/0141918 | A1* | 5/2017 | Dubrova | H04L 9/3242 |
| 2017/0244564 | A1* | 8/2017 | Näslund | H04L 9/3242 |
| 2017/0310684 | A1* | 10/2017 | Wagner | H04L 9/3242 |
| 2020/0092098 | A1* | 3/2020 | Zeh | G06F 21/72 |
| 2020/0117814 | A1* | 4/2020 | Ito | G06F 21/76 |
| 2021/0089388 | A1* | 3/2021 | Makaram | G06F 21/64 |
| 2021/0165916 | A1* | 6/2021 | Abhyankar | H04L 9/3242 |
| 2021/0266146 | A1* | 8/2021 | Troia | H04L 1/0061 |
| 2022/0138286 | A1* | 5/2022 | Zage | G06F 21/602 |
| | | | | 726/26 |
| 2023/0019372 | A1* | 1/2023 | Baker | H04L 9/0643 |

FOREIGN PATENT DOCUMENTS

| | | | | |
|---|---|---|---|---|
| WO | WO-2015186829 A1 * | 12/2015 | | B60R 16/023 |
| WO | WO-2022135686 A1 * | 6/2022 | | |

* cited by examiner

SYSTEM FOR AN IMPROVED SAFETY AND SECURITY CHECK

BACKGROUND

A system may include one or more hardware accelerators capable of performing operations related to providing communication safety and security for the system. Such hardware accelerators include, for example, a cryptographic accelerator capable of performing encryption and/or decryption for securing data, a hash accelerator for executing a hash function associated with verifying authenticity of the data, among other examples. In some cases, a hardware accelerator is a co-processor of the system, and is intended to improve performance of the system by providing dedicated hardware for performing operations related to providing communication security (rather than such operations being performed by software and/or by a general purpose central processing unit (CPU) of the system).

SUMMARY

In some implementations, a system includes a cryptographic accelerator to generate a first check value based on a payload received in a message, and provide the first check value to a first comparator and to a second comparator; the first comparator to: receive the first check value from the cryptographic accelerator, determine whether the first check value matches a second check value, the second check value being a check value received in the message, and provide a first output indicating whether the first check value matches the second check value; and the second comparator to: receive the first check value from the cryptographic accelerator, determine whether the first check value matches the second check value, and provide a second output indicating whether the first check value matches the second check value.

In some implementations, a method includes receiving, by a cryptographic accelerator, a payload of a received message; generating, by the cryptographic accelerator, a first check value based on the payload; obtaining, by each comparator of a plurality of comparators, the first check value generated by the cryptographic accelerator; obtaining, by each comparator of the plurality of comparators, a second check value, wherein the second check value is a check value included in the received message; determining, by each comparator of the plurality of comparators, whether the first check value matches the second check value; and providing, by each comparator of the plurality of comparators, a respective output, of a plurality of outputs, wherein each output of the plurality of outputs is provided by a different comparator of the plurality of comparators.

In some implementations, a system includes a cryptographic accelerator to generate a check value based on a payload received in a message; a first comparator to: determine whether the check value generated by the cryptographic accelerator matches a check value received in the message, and provide a first output indicating whether the check value generated by the cryptographic accelerator matches the check value received in the message; a second comparator to: determine whether the check value generated by the cryptographic accelerator matches a check value received in the message, and provide a second output indicating whether the check value generated by the cryptographic accelerator matches the check value received in the message; and a processor to: determine whether the cryptographic accelerator, the first comparator, or the second comparator have experienced a hardware fault, based on the first output and the second output.

DETAILED DESCRIPTION

The following detailed description of example implementations refers to the accompanying drawings. The same reference numbers in different drawings may identify the same or similar elements.

A system may be required to ensure safety and security of data (e.g., a message payload) that is transferred, stored, or otherwise processed by the system. Conventionally, a first check value is used for checking safety of the data, while a second (i.e., separate) check value is used for checking security of the data. The safety check value may be, for example, a cyclic redundancy check (CRC) value, while the security check value may be, for example, an integrity check value or message authentication code (MAC). The safety check value and the security check value are typically attached to a message payload and both check values are transferred or stored along with the payload.

In some scenarios, to reduce overhead, a system can be configured to use a single check value for evaluating both safety and security of data. Here, rather than attaching both a safety check value and a security check value to the message payload, a single safety and security check value can be attached to the payload. The use of the single safety and security check value reduces overhead associated with transferring the payload, meaning that effective communication bandwidth is increased. In some cases, the safety and security check value (i.e., the single value based on which both safety and security can be evaluated) may be an integrity check value or a MAC. Here, evaluation of the safety and security check value for a message (e.g., a message carrying data from a braking sensor in an automotive application) received by a system (e.g., a microcontroller, an electronic control unit (ECU), or the like), forms the so-called "last mile" of safety protection before data carried in the message is used by an application to execute commands based on the data (e.g., "brake now").

Due to the criticality of the protection measure that evaluates data safety and security, implementation of the integrity check value or the MAC, and the evaluation of the result provided by the protection measure, should follow applicable safety standards for end-to-end protection. In the automotive context, an Automotive Safety Integrity Level (ASIL) scheme may be used to dictate functional safety requirements for a protection measure associated with evaluating safety and security of data. The ASIL scheme is a risk classification scheme defined by the International Organization for Standardization (ISO) 26262 standard (titled Functional Safety for Road Vehicles), which provides a standard for functional safety of electrical and/or electronic systems in production automobiles. An ASIL classification defines safety requirements necessary to be in line with the ISO 26262 standard. An ASIL is established by performing a risk analysis of a potential hazard by looking at severity, exposure, and controllability of a vehicle operating scenario. A safety goal for that hazard in turn carries the ASIL requirements. There are four ASILs identified by the standard: ASIL A, ASIL B, ASIL C, and ASIL D. ASIL D dictates the highest integrity requirements, while ASIL A dictates the lowest. A hazard with a risk that is low (and, therefore, does not require safety measures in accordance with ISO 26262) is identified as quality management (QM). In some cases, it is desirable or required that a protection measure for evaluating safety and security achieves a high ASIL. For example, it may be desirable or required that such a protection measure used in a braking sensor application achieves ASIL D. According to ASIL D, a malfunctioning behavior within a data path of the protection measure or a malfunctioning behavior associated with the evaluation performed by the protection measure should be detected with a probability of 99.9% and systematic faults must be detected with at least 99% coverage.

Further, any malfunction (e.g., due to a single point fault) that can cause a falsified message to be consumed by an application that could result in harm to a person must be prevented. This means, in the context of the braking application for example, that a falsified message must be detected before a braking action is triggered based on data included in the falsified message. For hardware, providing such protection means that any malfunctioning behavior within the data path of the protection measure or with respect to the evaluation performed by the protection measure during operation should be detected. Conventional hardware platforms that enable utilization of the combined safety and security check value described above do not fulfill these criteria. As a result, a handshake protocol between software tasks dedicated to and qualified for safety, and software tasks dedicated to and qualified for security, is needed. However, such a handshake protocol is complex and costly in terms of system performance and, therefore, is undesirable.

Some implementations described herein provide techniques and apparatuses for an improved safety and security check that utilizes a single safety and security check value. In some implementations, the improved safety and security check is enabled by a single cryptographic accelerator and a pair of redundant comparators (e.g., a first comparator and a second comparator). Here, the cryptographic accelerator generates a check value based on a payload received in a message and provides the generated check value to a first comparator and to a second comparator. In some implementations, the first comparator receives the generated check value from the cryptographic accelerator, determines whether the generated check value matches a check value received in the message, and provides a first output indicating whether the generated check value matches the received check value. Similarly, the second comparator receives the generated check value from the cryptographic accelerator, determines whether the generated check value matches the received check value, and provides a second output indicating whether the first check value matches the second check value.

Here, the use of the redundant comparators (i.e., the first comparator and the second comparator) enables detection of a hardware fault associated with the comparison of the check value generated by the cryptographic accelerator and the check value in the message. Such a hardware fault can be safety related (e.g., a stuck-at fault, a random hardware fault due to alpha particles, or the like) or can be security related (e.g., a fault caused by a laser attack, needle forcing, or the like). In case of a hardware fault, a given comparator could erroneously provide an output indicating that the generated check value matches the received check value even though the generated check value differs from the received check value. However, the redundant comparators prevent such false-positives from being missed by the system.

In some implementations, because a single safety and security check value is used, overhead associated with transferring or storing the payload is reduced (e.g., as compared to using separate safety and security check values). Further, an amount of area required to implement hardware for performing the improved safety and security check is relatively small (e.g., since a single cryptographic accelerator is needed). Additionally, the need for a complex and costly handshake protocol between software tasks is eliminated.

Figure 1:
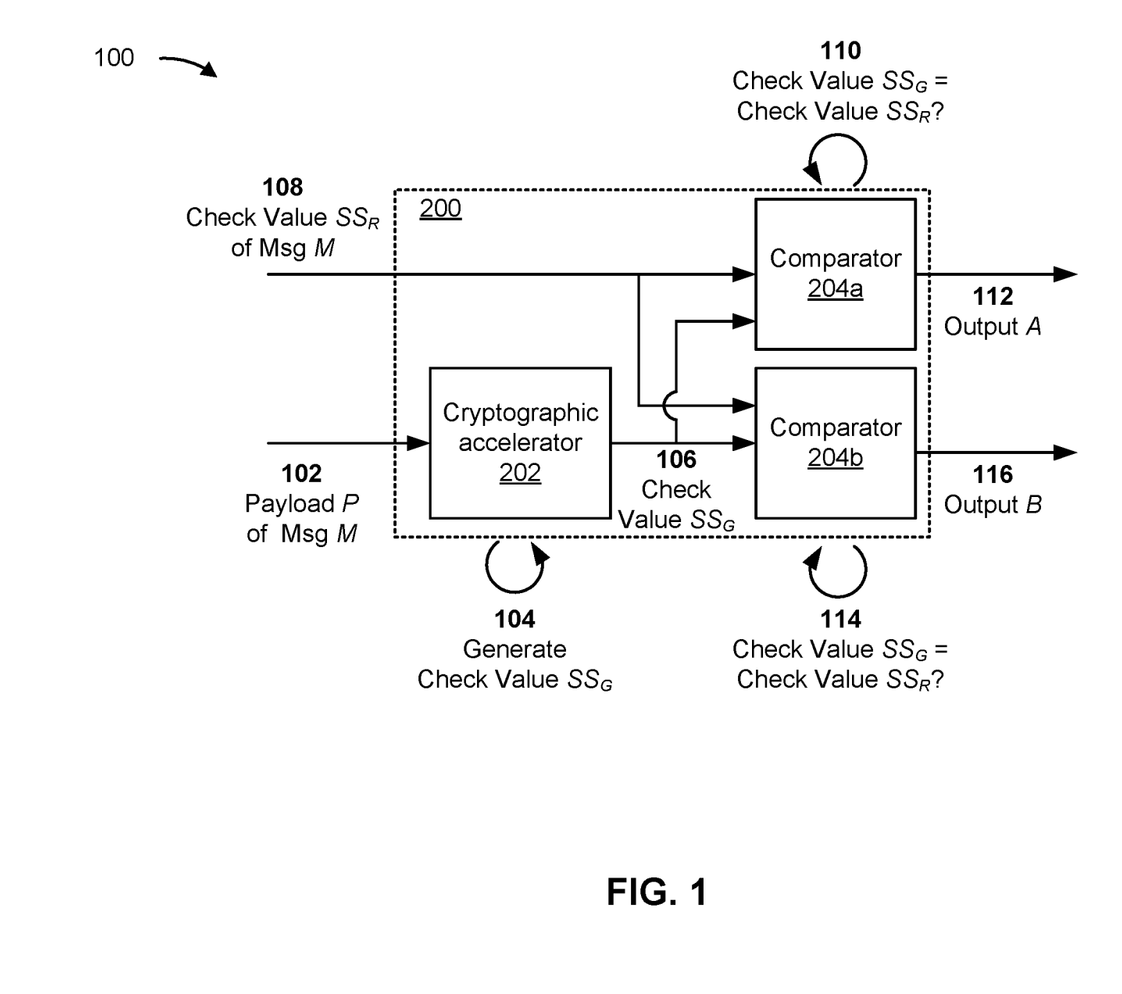
FIG. 1 is a diagram illustrating an example of an improved safety and security check in accordance with the present disclosure.

FIG. 1 is a diagram of an example implementation 100 of an improved safety and security check in accordance with aspect of the present disclosure. As shown in FIG. 1, example implementation 100 includes a system 200 comprising a cryptographic accelerator 202, a comparator 204a, and a comparator 204b. In some implementations, the cryptographic accelerator 202, the comparator 204a, and the comparator 204b are implemented in hardware. The components of system 200 are described in more detail below in connection with FIG. 2.

In some implementations, the system 200 receives a message M that includes a payload P and a safety and security check value $SS_R$. For example, the system 200 may be implemented on a microcontroller or an ECU associated with controlling braking in an automotive application, and may receive, from a braking sensor, a message M that includes a payload P carrying data based on which a braking action may be decided. Here, the check value $SS_R$ may be, for example, a MAC or an integrity check value generated by the braking sensor and appended to the payload P.

As shown in FIG. 1 by reference 102, the cryptographic accelerator 202 is provided with the payload P of a message M. As shown by reference 104, the cryptographic accelerator 202 generates a safety and security check value $SS_G$ based on the payload P. That is, the cryptographic accelerator 202 generates the check value $SS_G$ based on the payload P received by the cryptographic accelerator 202. In some implementations, the check value $SS_G$ may be, for example, a MAC or an integrity check value.

In some implementations, the cryptographic accelerator 202 is configured to generate the check value $SS_G$ using a key configured on the cryptographic accelerator 202. In some implementations, safety of the key used by the cryptographic accelerator 202 is provided by a safe key write. Alternatively, safety of the key used by the cryptographic accelerator 202 may be provided by a key check operation performed after a non-safe key write. Additionally, in some implementations, the cryptographic accelerator 202 is configured to generate the check value $SS_G$ according to a message specific configuration.

As shown by reference 106, the cryptographic accelerator 202 provides the check value $SS_G$ to the comparator 204a and to the comparator 204b, and the comparator 204a and the comparator 204b receive the check value $SS_G$, accordingly. As shown by reference 108, the comparator 204a and the comparator 204b also receive the check value $SS_R$ (i.e., the safety and security check value received in the message M).

As shown by reference 110, the comparator 204a determines whether the check value $SS_G$ matches the check value $SS_R$. That is, the comparator 204a determines whether the check value $SS_G$ generated by the cryptographic accelerator 202 matches (e.g., is equal to or different from by less than a tolerance) the check value $SS_R$ received in the message M. As shown by reference 112, the comparator 204a then provides an output A indicating whether the check value $SS_G$ matches the check value $SS_R$ as determined by the comparator 204a. In some implementations, the comparator 204a provides the output A to a processor (e.g., a CPU) of the system 200 (not shown).

Additionally, as shown by reference 114, the comparator 204b determines whether the check value $SS_G$ matches the check value $SS_R$. That is, the comparator 204b makes a redundant determination of whether the check value $SS_G$ generated by the cryptographic accelerator 202 matches the check value $SS_R$ received in the message M. As shown by reference 116, the comparator 204b then provides an output B indicating whether the check value $SS_G$ matches the check value $SS_R$ as determined by the comparator 204b. In some implementations, the comparator 204b provides the output B to the processor of the system 200 (not shown).

In some implementations, the comparator 204a and the comparator 204b operate in lockstep when determining whether the check value $SS_G$ matches the check value $SS_R$ and providing the output A and the output B. That is, the comparator 204a and the comparator 204b may perform the same set of operations (e.g., determining whether the check value $SS_G$ matches the check value $SS_R$ and providing an output) at the same time, in parallel.

In some implementations, the processor to which the comparator 204a and the comparator 204b provide the output A and the output B can detect hardware faults associated with the cryptographic accelerator 202, the comparator 204a, or the comparator 204b based on the output A and the output B. For example, the processor may detect a hardware fault when the output A does not match the output B. Conversely, the processor may detect no hardware fault when the output A matches the output B.

Further, in some implementations, the processor to which the comparator 204a and the comparator 204b provide the output A and the output B can evaluate authenticity of the message M and safety of the payload P based on the output A and the output B. For example, the processor may authentic the message M and determine that the payload P is safe when both output A and output B indicate that the check value $SS_G$ matches the check value $SS_R$. Conversely, the processor may not authentic the message M or may determine that the payload P is not safe when at least one of the output A and output B indicates that the check value $SS_G$ does not match the check value $SS_R$. That is, in some implementations, the output A and the output B are provided to software running on the processor and the software can determine, based on the output A and the output B, whether the message M and the payload P have passed the safety and security check or that the message M should be discarded.

Notably, only a single cryptographic accelerator 202 is included in the system 200, meaning that cost and size of the system 200 is reduced (e.g., as compared to a safety and security solution that requires multiple cryptographic accelerators). Further, the system 200 can detect a malfunctioning behavior on a data path associated with the safety and security check performed by the system 200. In some implementations, detection of a malfunctioning behavior is enabled due to argumentation of the mathematics of the cryptographic accelerator 202 (e.g., when a Hamming distance of an algorithm used in the cryptographic accelerator 202 is sufficient to hold the safety argumentation, no double computation of the check value $SS_G$ is required).

As indicated above, FIG. 1 is provided as an example. Other examples may differ from what is described with regard to FIG. 1. For example, while example implementation 100 is described in the context of a use case associated with a payload P carried in a message M received by the system 200, other use cases are possible, such as authentication of memory content (e.g., when software code stored in a memory is protected with an authentication code). In this example, during boot of the system 200, the cryptographic accelerator 202 and the comparators 204 can be used to evaluate authenticity of a software image stored in the memory. In general, the system 200 (e.g., including the cryptographic accelerator 202 and the comparators 204) can be used in any application in which a safety and security check of two values is needed and where software can use a result of a redundant comparison for decision making or program flow control.

Further, the number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally, or alternatively, a set of components (e.g., one or more components) shown in FIG. 1 may perform one or more functions described as being performed by another set of components shown in FIG. 1.

Figure 2:
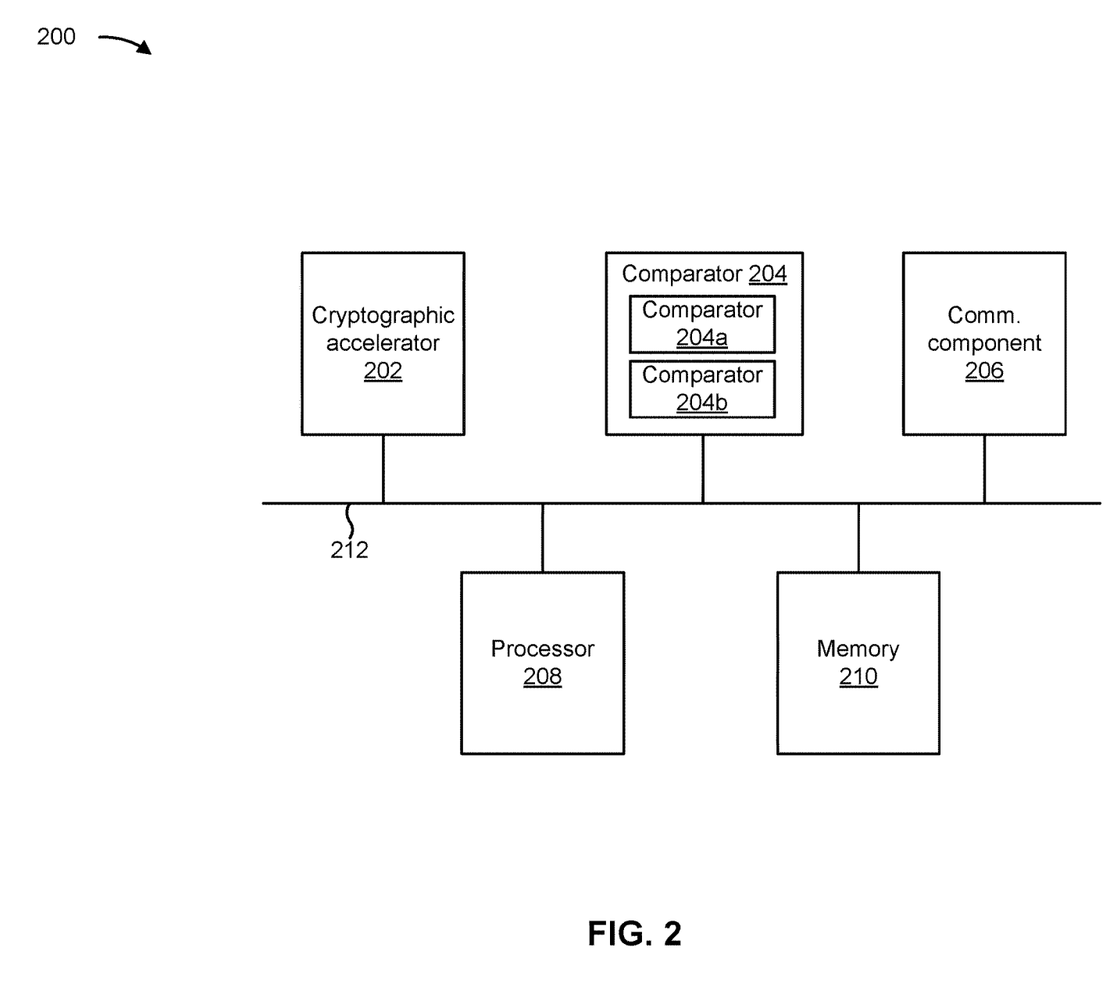
FIG. 2 is a diagram of an example system in which a cryptographic accelerator and a group of comparators described herein may be implemented.

FIG. 2 is a diagram of an example system 200 in which a cryptographic accelerator 202 and a group of comparators 204 (e.g., comparator 204a, comparator 204b) described herein may be implemented. As shown, the system 200 may include the cryptographic accelerator 202, the comparators 204 (e.g., including the comparator 204a and the comparator 204b), a communication component 206, a processor 208, a memory 210, and a bus 212.

Cryptographic accelerator 202 is a component to perform cryptographic operations associated with system 200, as described herein. In some implementations, the cryptographic accelerator 202 is capable of generating a check value $SS_G$ (e.g., a MAC, an integrity check value, or the like) based on a payload P of a message M received by the system 200, as described above. In some implementations, the cryptographic accelerator 202 is implemented in hardware. In some implementations, cryptographic accelerator 202 improves performance of the system 200 by providing hardware for performance of cryptographic operations (rather than cryptographic operations being performed by software and/or by a general purpose CPU of the system 200).

Comparator 204 includes two or more components (e.g., the comparator 204a and the comparator 204b) capable of determining whether the check value $SS_G$ (i.e., a check value generated by the cryptographic accelerator 202 based on the payload P of the message M) matches the check value $SS_R$ (i.e., a check value received in the message M), as described above. In some implementations, the comparator 204 includes the comparator 204a and the comparator 204b. That is, in some implementations, the comparator 204 includes one or more redundant comparators (e.g., in order to enable the improved safety and security check described herein).

Communication component 206 includes a component that enables system 200 to communicate with other devices or systems. For example, communication component 206 may include a receiver, a transmitter, a transceiver, a modem, or another type of component that enables system 200 to communicate with other devices or systems. In some implementations, the system 200 may receive the message M (e.g., including the payload P and the check value $SS_R$) via the communication component 206, and the communication component 206 may provide the message M the payload P, or the check value $SS_R$ to one or more other components of the system 200.

Processor 208 includes a processor capable of receiving the output A and the output B (e.g., from the comparator 204a and the comparator 204b, respectively), and detecting a hardware fault or evaluating safety and security associated with the message M based on the output A and the output B, as described above. In some implementations, the processor 208 includes a CPU, a graphics processing unit, a microprocessor, a controller, a microcontroller, a digital signal processor, a field-programmable gate array, an application-specific integrated circuit, and/or another type of processing component. In some implementations, the processor 208 is implemented in hardware, firmware, or a combination of hardware and software.

Memory 210 is a component to store and provide data to be processed by a component of system 200, such as the cryptographic accelerator 202, the comparator 204 (e.g., the comparator 204a, the comparator 204b), the processor 208, or the like. In some implementations, memory 210 may include a RAM, a read only memory (ROM), and/or another type of memory (e.g., a flash memory, a magnetic memory, and/or an optical memory).

Bus 212 is a component that enables communication among the components of system 200. For example, the bus 212 may enable communication between the cryptographic accelerator 202 and the comparator 204, and may enable communication between the comparators 204 and the processor 208.

As indicated above, FIG. 2 is provided as an example. Other examples may differ from what is described with regard to FIG. 2. The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more functions described as being performed by another set of components shown in FIG. 2.

Figure 3:
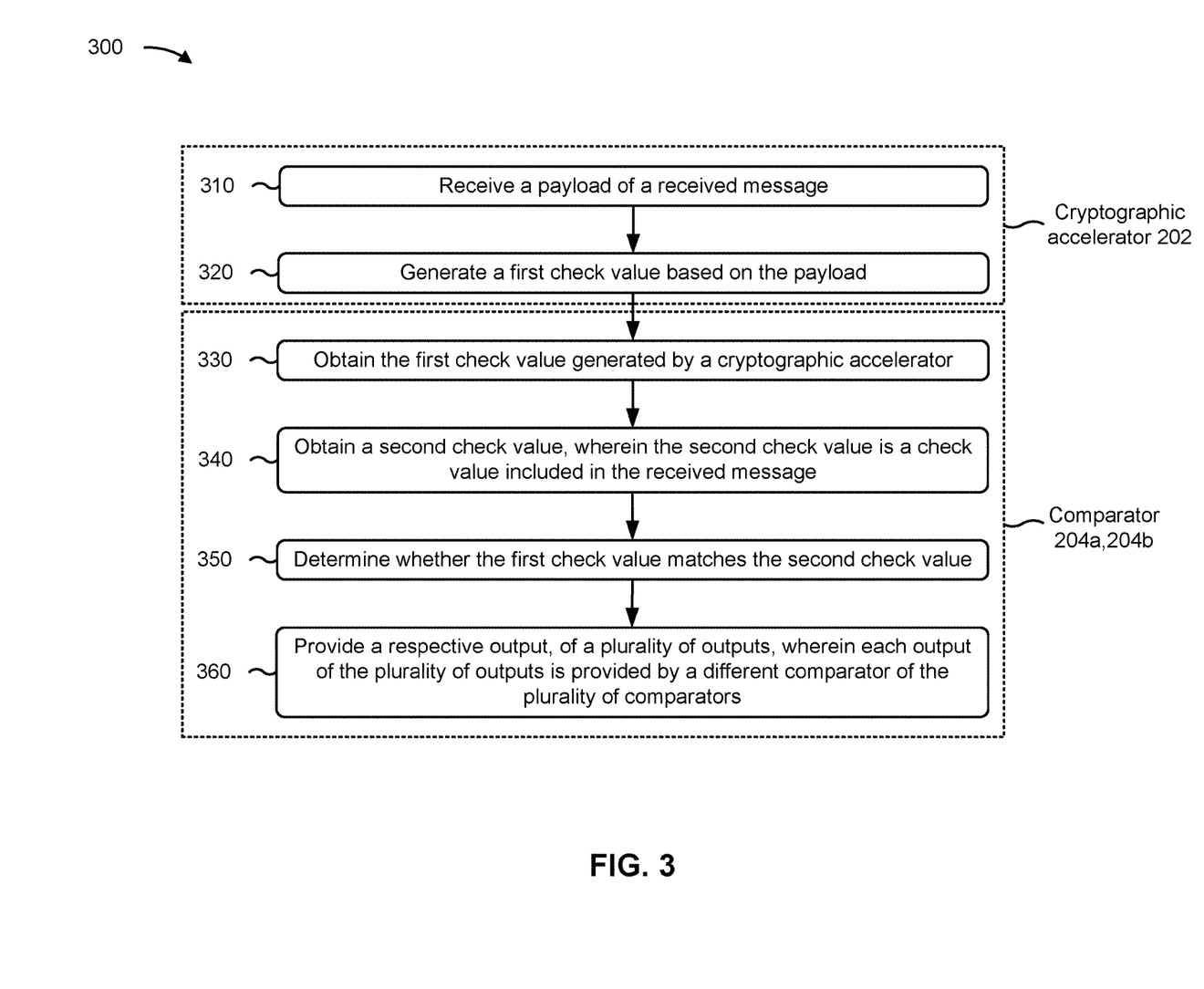
FIG. 3 is a flowchart of an example processes relating to the improved safety and security check in accordance with the present disclosure.

FIG. 3 is a flowchart of an example process relating to the improved safety and security check in accordance with the present disclosure. In some implementations, one or more process blocks of FIG. 3 may be performed by one or more components of a system (e.g., system 200), such as a cryptographic accelerator (e.g., cryptographic accelerator 202), a plurality of comparators (e.g., comparator 204a and comparator 204b), a communication component (e.g., communication component 206), a processor (e.g., a processor 208), a memory (e.g., the memory 210), or the like.

As shown in FIG. 3, process 300 may include receiving a payload of a received message (block 310). For example, the cryptographic accelerator may receive a payload P of a received message M, as described above.

As further shown in FIG. 3, process 300 may include generating a first check value based on the payload (block 320). For example, the cryptographic accelerator may generate a check value $SS_G$ based on the payload P, as described above.

As further shown in FIG. 3, process 300 may include obtaining the first check value generated by the cryptographic accelerator (block 330). For example, each comparator of the plurality of comparators may obtain the first check value generated by the cryptographic accelerator, as described above.

As further shown in FIG. 3, process 300 may include obtaining a second check value, wherein the second check value is a check value included in the received message (block 340). For example, each comparator of the plurality of comparators may obtain the check value $SS_R$, wherein the check value $SS_R$ is a check value included in the received message M, as described above.

As further shown in FIG. 3, process 300 may include determining whether the first check value matches the second check value (block 350). For example, each comparator of the plurality of comparators may determine whether the check value $SS_G$ matches the check value $SS_R$, as described above.

As further shown in FIG. 3, process 300 may include providing a respective output, of a plurality of outputs, wherein each output of the plurality of outputs is provided by a different comparator of the plurality of comparators (block 360). For example, each comparator of the plurality of comparators may provide a respective output, of a plurality of outputs, wherein each output of the plurality of outputs is provided by a different comparator of the plurality of comparators, as described above.

Process 300 may include additional implementations, such as any single implementation or any combination of implementations described below and/or in connection with one or more other processes described elsewhere herein.

In a first implementation, the cryptographic accelerator and the plurality of comparators are hardware components of a system.

In a second implementation, alone or in combination with the first implementation, the first check value is generated using a key configured on the cryptographic accelerator, wherein safety of the key is provided by either a safe key write or a key check operation performed after a non-safe key write.

In a third implementation, alone or in combination with one or more of the first and second implementations, determining whether the first check value matches the second check value and providing the plurality of outputs are performed by the plurality of comparators in lockstep.

In a fourth implementation, alone or in combination with one or more of the first through third implementations, the first check value is a first MAC and the second check value is a second MAC.

In a fifth implementation, alone or in combination with one or more of the first through fourth implementations, process 300 includes receiving the plurality of outputs and checking for a hardware fault associated with the cryptographic accelerator or the plurality of comparators.

In a sixth implementation, alone or in combination with one or more of the first through fifth implementations, process 300 includes receiving the plurality of outputs and evaluating authenticity of the message and safety of the payload.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software. It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system, comprising:
a cryptographic accelerator to:
generate a first check value based on a payload received in a message, the first check value comprising a first cyclic redundancy check (CRC) value or a first message authentication code (MAC), and
provide the first check value to a first comparator and to a second comparator; the first comparator to:
receive the first check value from the cryptographic accelerator,
determine whether the first check value matches a second check value, the second check value being a check value received in the message and comprising a second CRC value or a second MAC, and
provide a first output indicating a first result indicating that the first check value matches the second check value or a second result indicating that the first check value does not match the second check value; the second comparator to:
receive the first check value from the cryptographic accelerator,
determine whether the first check value matches the second check value, and
provide a second output indicating the first result indicating that the first check value matches the second check value or the second result indicating that the first check value does not match the second check value; and
a processor to:
detect a hardware fault based on whether the first output and the second output indicate a same result, and
evaluate an authenticity of the message and a safety of the payload based on whether the first output and the second output both indicate the first result.

2. The system of claim 1, wherein the cryptographic accelerator, the first comparator, and the second comparator are implemented in hardware.

3. The system of claim 1, wherein the cryptographic accelerator is to generate the first check value using a key configured on the cryptographic accelerator,
wherein safety of the key is provided by either a safe key write or a key check operation performed after a non-safe key write.

4. The system of claim 1, wherein the first comparator and the second comparator operate in lockstep when determining whether the first check value matches the second check value and providing the first output and the second output.

5. The system of claim 1, wherein the first check value is the first MAC and the second check value is the second MAC.

6. The system of claim 1, wherein the hardware fault is associated with the cryptographic accelerator, the first comparator, or the second comparator.

7. The system of claim 1, wherein the first check value is the first CRC value and the second check value is the second CRC value.

8. A method, comprising:
receiving, by a cryptographic accelerator, a payload of a received message;
generating, by the cryptographic accelerator, a first check value based on the payload, the first check value comprising a first cyclic redundancy check (CRC) value or a first message authentication code (MAC);
obtaining, by each comparator of a plurality of comparators, the first check value generated by the cryptographic accelerator;
obtaining, by each comparator of the plurality of comparators, a second check value,
wherein the second check value is a check value included in the received message, and
wherein the second check value comprises a second CRC value or a second MAC;

determining, by each comparator of the plurality of comparators, whether the first check value matches the second check value;

providing, by each comparator of the plurality of comparators, a respective output, of a plurality of outputs,
   wherein each output of the plurality of outputs is provided by a different comparator of the plurality of comparators, and
   wherein each output of the plurality of outputs indicates a first result that indicates that the first check value matches the second check value or a second result that indicates that the first check value does not match the second check value;

detecting a hardware fault based on whether the plurality of outputs indicates a same result and evaluating an authenticity of the received message and a safety of the received message based on whether each output, of the plurality of outputs, indicate the first result.

9. The method of claim 8, wherein the cryptographic accelerator and the plurality of comparators are hardware components of a system.

10. The method of claim 8, wherein the first check value is generated using a key configured on the cryptographic accelerator,
   wherein safety of the key is provided by either a safe key write or a key check operation performed after a non-safe key write.

11. The method of claim 8, wherein determining whether the first check value matches the second check value and providing the plurality of outputs are performed by the plurality of comparators in lockstep.

12. The method of claim 8, wherein the first check value is the first MAC and the second check value is the second MAC.

13. The method of claim 8, wherein the hardware fault is associated with the cryptographic accelerator or the plurality of comparators.

14. The method of claim 8, wherein a processor receives the plurality of outputs and evaluates the authenticity of the received message and a safety of a payload of the received message.

15. A system, comprising:
   a cryptographic accelerator to generate a check value based on a payload received in a message, the check value generated by the cryptographic accelerator comprising a first cyclic redundancy check (CRC) value or a first message authentication code (MAC);
   a first comparator to:
      determine whether the check value generated by the cryptographic accelerator matches a check value received in the message, the check value received in the message comprising a second CRC value or a second MAC, and
      provide a first output indicating a first result that indicates that the check value generated by the cryptographic accelerator matches the check value received in the message or a second result that indicates that the check value generated by the cryptographic accelerator does not match the check value received in the message;
   a second comparator to:
      determine whether the check value generated by the cryptographic accelerator matches the check value received in the message, and
      provide a second output indicating the first result or the second result; and
   a processor to:
      determine whether the cryptographic accelerator, the first comparator, or the second comparator have experienced a hardware fault, based on whether the first output and the second output indicate a same result.

16. The system of claim 15, wherein the cryptographic accelerator, the first comparator, and the second comparator are implemented in hardware.

17. The system of claim 15, wherein the cryptographic accelerator is to generate the check value according to a message specific configuration.

18. The system of claim 15, wherein the first comparator and the second comparator are configured to operate in lockstep.

19. The system of claim 15, wherein the check value generated by the cryptographic accelerator is the first MAC and the check value received in the message is the second MAC.

20. The system of claim 15, wherein the processor is further to evaluate an authenticity of the message and a safety of the payload based on whether the first output and the second output both indicate the first result.

* * * * *